United States Patent
Sirek (10) Patent No.: US 7,644,083 B1
(45) Date of Patent: Jan. 5, 2010

(54) EFFICIENTLY PERFORMING INEQUALITY JOINS

(75) Inventor: Mark W. Sirek, San Diego, CA (US)

(73) Assignee: Teradata US, Inc., Miamisburg, OH (US)

( * ) Notice: Subject to any disclaimer, the term of this patent is extended or adjusted under 35 U.S.C. 154(b) by 986 days.

(21) Appl. No.: 10/954,579

(22) Filed: Sep. 30, 2004

(51) Int. Cl.
*G06F 17/30* (2006.01)

(52) U.S. Cl. .............................................. 707/7; 712/1

(58) Field of Classification Search .................. 707/7, 707/3, 100, 6, 4, 1, 102
See application file for complete search history.

(56) References Cited

U.S. PATENT DOCUMENTS

| | | | |
|---|---|---|---|
| 5,875,447 A * | 2/1999 | Goel et al. | 707/4 |
| 5,937,401 A * | 8/1999 | Hillegas | 707/2 |
| 6,134,546 A * | 10/2000 | Bestgen et al. | 707/4 |
| 6,748,392 B1 * | 6/2004 | Galindo-Legaria et al. | 707/102 |
| 6,804,678 B1 * | 10/2004 | Luo et al. | 707/101 |
| 7,069,272 B2 * | 6/2006 | Snyder | 707/102 |
| 7,136,850 B2 * | 11/2006 | Keller et al. | 707/4 |
| 2004/0158548 A1 * | 8/2004 | Boulle | 707/1 |

OTHER PUBLICATIONS

D. DeWitt et al., "An Evaluation of Non-Equijoin Algorithms", VLDB 1991:443-452 (Sep. 1991).*
R. Balasubramanian et al, "Path Balance Heuristic for Self-Adjusting Binary Search Trees", The institue of Mathematical Sciences, C.I.T. Campus, 1995.*
"Lecture 8: Dynamic Binary Search Trees", CS 373, Fall 2002, pp. 1-6.*
T.H. Cormen et al., "Introduction to Algorithms," The MIT Press, p. 245 (1990).
T.J. Rolfe, "One-Time Binary Search Tree Balancing: The Day/Stout/Warren (DSW) Algorithm," SIGCSE Bulletin, vol. 34, No. 4, pp. 85-88 (Dec. 2002).
Q.F. Stout et al., "Tree Rebalancing in Optimal Time and Space," Communications of the ACM, vol. 29, No. 9, pp. 902-908 (Sep. 1986).

* cited by examiner

*Primary Examiner*—Apu M Mofiz
*Assistant Examiner*—Hung D Le
(74) *Attorney, Agent, or Firm*—Trop, Pruner & Hu P.C.

(57) ABSTRACT

A database system is able to receive a query that specifies an inequality join involving at least a first relation and a second relation. A plurality of segments of the first relation are sorted in the cache. Each sorted segment of the first relation in the cache is compared with the second relation.

13 Claims, 5 Drawing Sheets

EFFICIENTLY PERFORMING INEQUALITY JOINS

BACKGROUND

A database is a collection of logically related data that is accessible by one or more users. A popular type of database system is the relational database management system, which includes relational tables made up of rows and columns. Each row represents an occurrence of an entity defined by the table, with an entity being a person, place, or thing about which the table contains information.

To extract data from a relational table, queries according to a standard database query language (e.g. Structured Query Language or SQL) can be used. Examples of SQL statements include INSERT, SELECT, UPDATE, and DELETE. The SELECT statement is used to retrieve information from the database and to organize information for presentation to the user or to an application program. The SELECT statement can also specify a join operation to join rows of multiple tables. A common type of join operation is a simple join (or equijoin), which uses an equal (=) comparison operator to join rows from multiple tables. Another type of join is a non-equijoin, or inequality join, which is based on operators other than the equal comparison (e.g., >, <, ≧, ≦, etc.).

Conventionally, join algorithms have been implemented to enable efficient performance of equijoins. However, if no equality terms are present in a join predicate of a query, an inequality join is specified and then a product join is typically performed. In a product join, every left relation row is compared with every right relation row. The terms "left relation" and "right relation" refer to the relations on the left and right sides, respectively, of an inequality operator (e.g., <, >, ≦, ≧). Efficient algorithms have typically not been provided for inequality joins.

SUMMARY

In general, methods and apparatus are provided to more efficiently perform inequality joins in a database system. For example, a method for use in a database system having a persistent storage and a cache includes receiving a query to perform an inequality join involving at least a first relation and a second relation. The first relation is sorted, and the sorted segment of the first relation is received in the cache. The sorted segment of the first relation in the cache is compared with the second relation.

As another example, a method for use in a database system having a persistent storage and a cache includes receiving a query to perform an inequality join involving at least a first relation and a second relation, and sorting a plurality of segments of the first relation in the cache. After individually sorting each of the cache-sized blocks (segments) of rows, the blocks are appended to one another. The first relation is locally sorted in each segment of rows, but is not in order when considering all rows in the relation. After the sort operation, the rows are read into cache one segment at a time. Another variation of the algorithm is to delay the sort until a segment of rows is read into cache. The method then compares the sorted segment of the first relation in the cache with the second relation.

Other or alternative features will become apparent from the following description, from the drawings, or from the claims.

DETAILED DESCRIPTION

Figure 1:
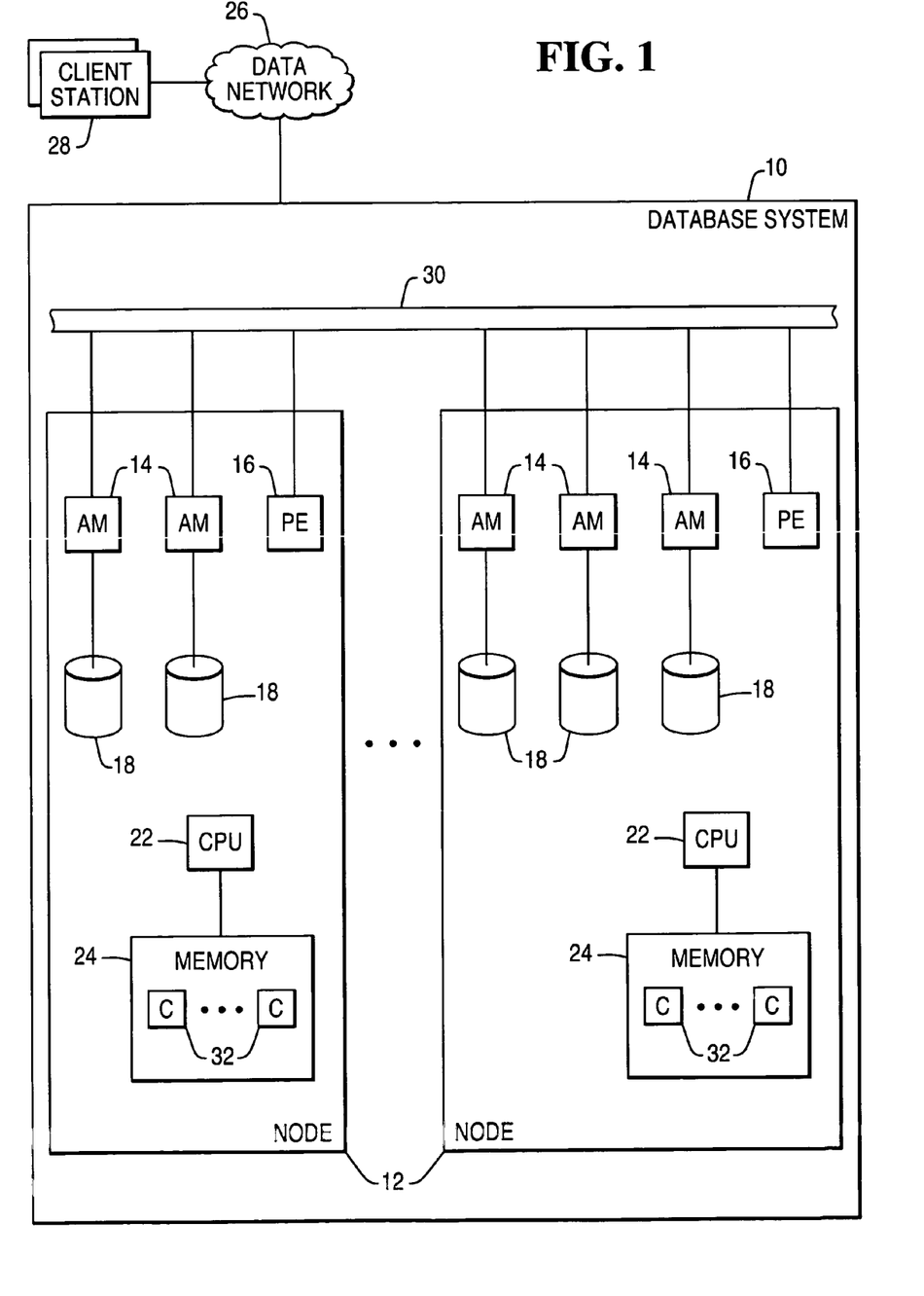
FIG. 1 is a block diagram of an example database system that incorporates some embodiments of the invention.

FIG. 1 shows a database system 10 that is accessible by one or more client stations 28. The client station 28 is coupled to the database system 10 over a link 26. As examples, the link 26 can be a local area network (LAN), wide area network (WAN), or other type of communications channel. From the client station 28, a user or software application is able to issue database queries to extract data stored in the database system 10. Such queries are according to a standard database query language, such as the Structured Query Language (SQL) defined by the American National Standards Institute (ANSI). One version of SQL is the SQL-92 Standard, while another version is the SQL-99 Standard (also referred to as the SQL-3 Standard).

The database system 10 includes a plurality of nodes 12 each containing various elements. In one example, each node 12 includes one or more access modules 14, such as access module processors (AMPs), used in TERADATA® database systems from NCR Corporation. Although reference is made to the TERADATA® database system, other embodiments of the invention can be incorporated into other types of database systems.

Each access module 14 is responsible for managing access of a respective portion of the database. An "access module" refers to any control module (whether implemented in software, hardware, or both) that manages access (including reads and writes) of data stored in the database. In some configurations, the access module is also able to manage the definition (e.g., creation, modification) of tables in the database. Each access module 14 is associated with a respective storage module 18, sometimes referred to as a virtual disk. Although shown as being separate, the storage modules 18 in the database system 10 in some cases are actually part of the same physical storage device or system (such as a disk array system). The arrangement shown in FIG. 1 is one example of a massively parallel processing (MPP) database system. In another arrangement, a database system includes a single node having plural processors, which is an example of a symmetric multiprocessing (SMP) system. These systems are generally referred to as "parallel database systems" due to the presence of plural access modules (implemented as software, hardware, or a combination thereof). In yet another embodiment, the database system can be a single-processor system.

The access modules 14 are coupled by an interconnect layer 30 that handles internal communications among the access modules as well as between the access modules 14 and parsing engines (PEs) 16. Each of the nodes 12 includes one or more parsing engines 16 (or none). When a parsing engine 16 receives an SQL statement from a client application, the parsing engine interprets the statement, checks it for proper SQL syntax, and sends out executable steps to be performed by one or more access modules 14. The parsing engines 16 and access modules 14 are software modules that are executable on one or more processors 22 in each node 12. The processors 22 are coupled to one or more memory modules 24.

In accordance with some embodiments of the invention, an algorithm is provided to efficiently perform inequality joins in the database system 10. An inequality join is specified by a query, such as an SQL SELECT query, that contains a join predicate in which there are no conjuncted equality terms. The term "conjuncted" means AND'ed. For example, if the terms are OR'ed: table1.column1=table2.column1 or table1.column1>table2.column2, there is an equality term, but it cannot be used to bind the two tables.

In a scenario where an inequality join is specified, a product join is performed where every left relation row is compared with every right relation row. In the join predicate, an inequality operator (e.g., <, >, ≦, ≧, etc.) specifies a comparison between the left relation and a right relation. Usually, a join predicate has a number of inequality terms that are AND'ed together. This format of join terms (plural inequality terms that are AND'ed together) is referred to as a conjunctive normal form (CNF). An example of the SELECT query that contains an expression in conjunctive normal form of more than one inequality term is provided below:

```
SELECT      T1.A,T1.B
FROM        T1, T2, T3
WHERE       T1.A < T2.C AND T2.B > T3.E;
```

Note that the join predicate as included in a join query may not be initially in a conjunctive normal form. However, during the analysis of the query by the parsing engine, the join predicate can be placed into conjunctive normal form for analysis. Thus, if an analysis of join terms in conjunctive normal form yields at least one AND'ed inequality condition involving an expression of left relation columns on one side of the inequality operator and right relation columns on the other side of the inequality operator, then piecewise ordering (by sorting) of one relation will allow rows for which the inequality condition is false to be skipped over when performing the join.

However, rather than using an external sort of the left or right relation (in which the sort is performed on the relation in persistent storage, usually a relatively slow disk-based storage), sorting according to some embodiments is performed on individual segments in caches 32 of each node in the database system 10. A cache is normally implemented with semiconductor memory, which usually has access speeds orders of magnitude greater than access speeds for disk-based storage devices. However, a "cache" can refer to any storage device that has an access speed greater than the access speed of persistent storage. For example, persistent storage can be implemented with a first type of disk-based storage device, while the cache can be implemented with a faster, second type of disk-based storage device. The second type of disk-based storage device has access speeds greater than the first-type of disk-based storage device. In alternative implementations, the persistent storage can be implemented with disk-based storage devices, while the cache is implemented with semiconductor memory or other high-speed memory. In yet another implementation, the persistent storage can be implemented with another type of storage technology, such as flash or other non-volatile storage technology and so forth.

In FIG. 1, the caches 32 are actually part of the main memory 24. Alternatively, the caches 32 can be separate from the main memory 24. Also, the multiple caches 32 are associated with respective access modules 14.

In the ensuing discussion, reference is made to caching rows of a first relation of an inequality join term in a cache, with the rows of the first relation sorted in the cache prior to comparison of the rows of the first relation in the cache with the rows of the second relation. Each of the rows of the second relation is read once and compared to the sorted rows of the first relation that are stored in the cache. Caching the first relation enhances the speed at which the inequality join can be performed due to the large number of comparisons that are performed. Combining caching and sorting according to some embodiments of the invention improves the performance of the sort and leads to overall performance improvement for the inequality join. Since the second relation is read once for each segment of the first relation in the cache, there is no need to sort the entire first relation prior to performing the comparison of the first relation and second relation for the inequality join. By breaking one large sort (of the entire first relation) into smaller sorts (of different segments of the first relation in the cache), an increase in speed by a factor of (M*(runtime of original sort))/(N*(runtime of sorting a full cache of rows)) can be achieved, where M represents the number of rows of the entire first relation, and N represents the number of rows of the different segments of the first relation that fit in one cache. For example, for an $O(N^2)$ sort algorithm, the cost to sort 12 rows is (C) (12) (12)=144C, where C is the cost to compare two rows and place them in order. Thus, in this example, the value of (M* runtime of original sort) is 144C. If the cache size is three rows, then the cost to sort four full caches (corresponding to the four segments of the first relation stored in cache) is as follows:

$$((C)(3)(3))+((C)(3)(3))+((C)(3)(3))+((C)(3)(3))=36C$$

The value of (N* runtime of original sort) in this example is 36C. The increase in speed is (144C)/(36C)=4.

For a typical sort algorithm, such as merge sort or heap sort, that has an O (n log n) run time, the increase in speed is as follows:

$$\frac{(M)(C)(N\log N)}{(N)(C)(M\log M)} = \frac{\log N}{\log M}$$

The actual increase in speed may actually be greater than noted above if the first relation is large, because the cost of writing merged heaps to persistent storage adds to the cost of the external heap sort that has to be performed when the relation does not fit in memory.

Figure 2A:
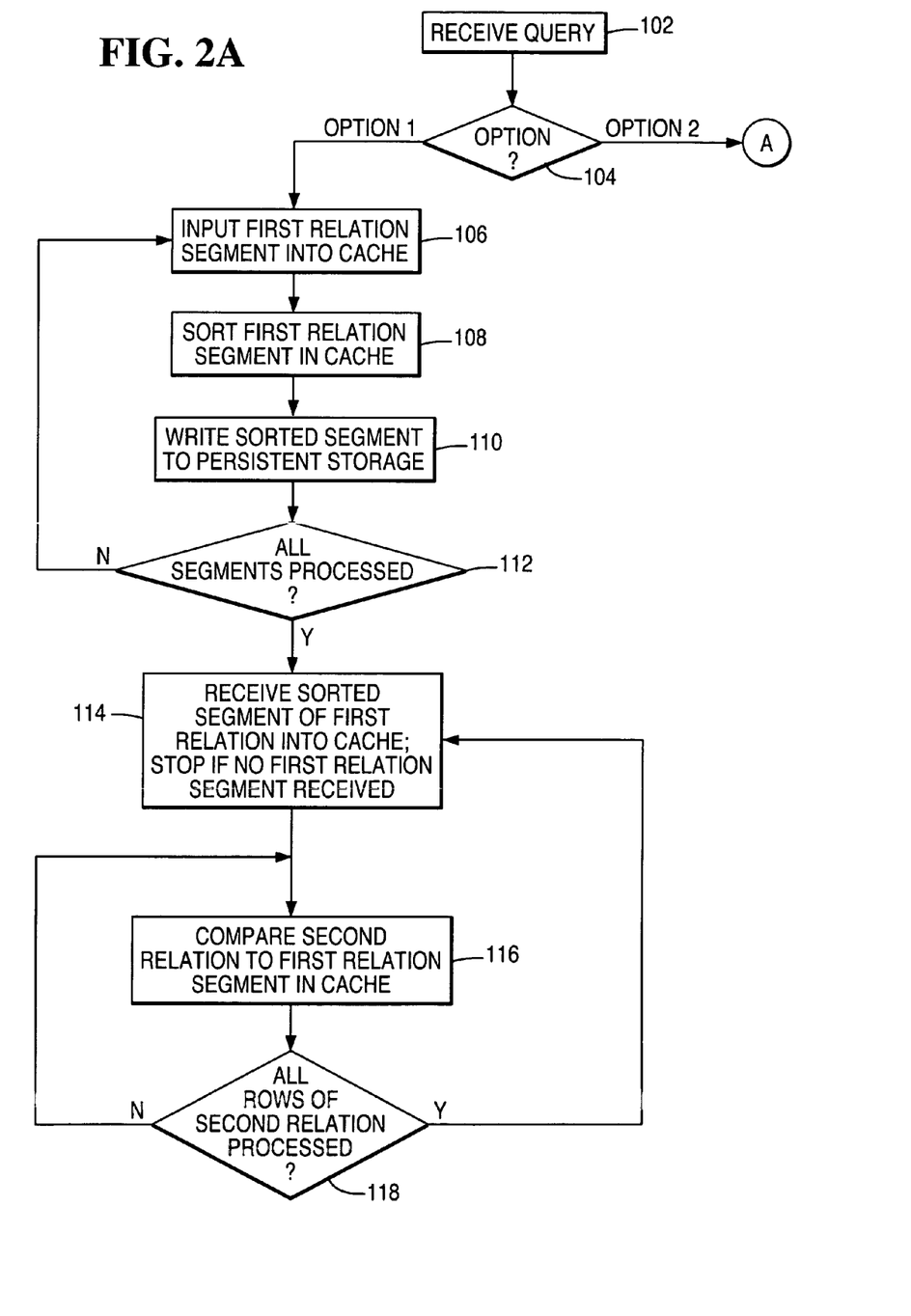
FIGS. 2A-2B are flow diagrams of a process of performing an inequality join, according to an embodiment.
Figure 2B:
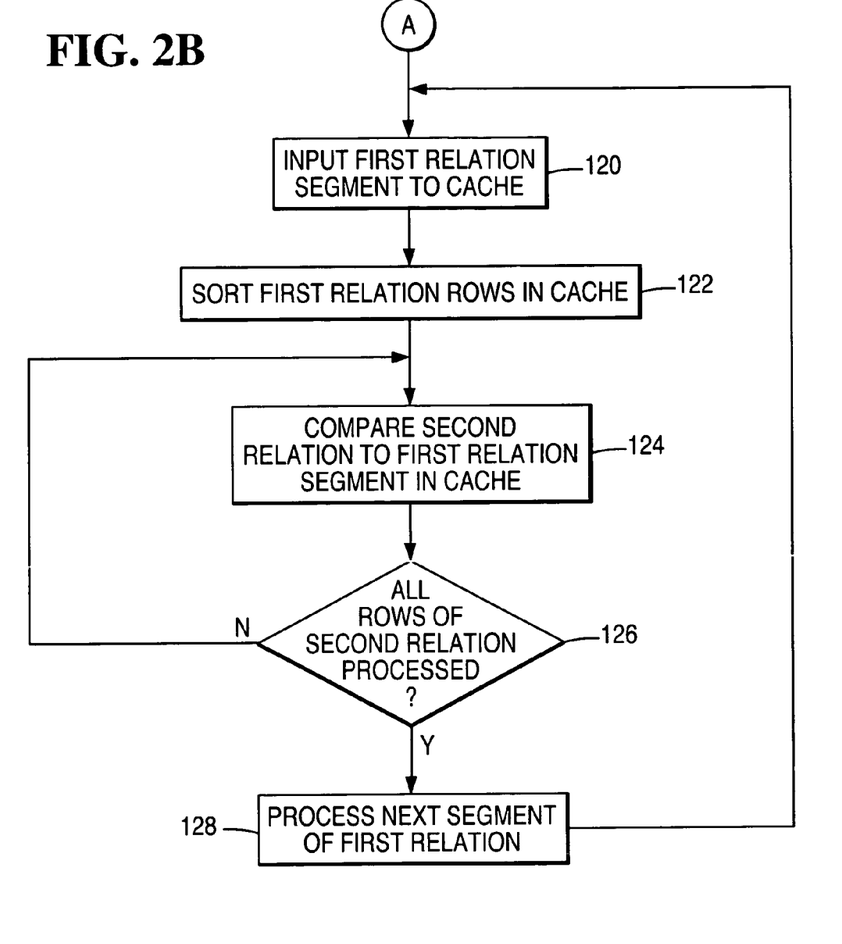

FIGS. 2A-2B show the process of performing an inequality join using the enhanced algorithm discussed above. There are two options for performing the inequality join, both depicted in FIGS. 2A-2B. The database system 10 receives (at 102) a query that has a join predicate containing an inequality term. In response to such a query, the database system 10 divides the first relation into segments. The database system determines (at 104) which option is to be used. If a first option is selected, then the database system inputs (at 106) the first relation segment into the cache. The first relation segment is then sorted (at 108) in the cache. In some embodiments, the sorted first relation segment can be represented as a balanced binary search tree to improve subsequent comparison operations with the second relation. The balanced binary search tree is described in further detail below.

The sorted first relation segment is written (at 110) to persistent storage. Next, the database system determines if all first relation segments have been processed (at 112). If not, acts 106-112 are repeated. However, if all segments of the first relation have been processed, the database system receives (at 114) a sorted segment of the first relation into cache. Next, the database system compares (at 116) the second relation to the first relation segment in the cache to perform the inequality join. The database system 10 then determines (at 118) if all rows of the second relation have been processed for the particular first relation segment in the cache. If not, the process of act 116 is repeated. However, if all rows of the second relation have been compared to the first relation segment, then the database system processes (at 114) the next segment of the first relation by inputting such next sorted first relation segment into the cache and performing act 116. The process continues until all segments of the first relation have been processed. The process stops (at 114) when no further first relation segments are received.

If a second option is selected, as determined at 104, the database system 10 inputs the next first relation segment input (at 120) to cache. The rows of the first relation segment in the cache are then sorted (at 122) and represented in balanced binary search tree format in some implementations. After sorting of the first relation rows in the cache, and prior to sorting the next segment of the first relation, the inequality join is performed (at 124), where each row of the second relation is compared to the first relation segment in the cache. The database system 10 then determines (at 126) if all rows of the second relation have been processed for the particular first relation segment in the cache. If not, the process at 124 is repeated. However, if all rows of the second relation have been compared to the first relation segment, then the database system processes (at 128) the next segment of the first relation. This next segment is then input (at 120) into the cache, and acts 122, 124, 126, and 128 are repeated. The process in FIG. 2B continues until all segments of the first relation have been processed. The process stops (at 128) if no further first relation segments are received.

In the parallel database system environment depicted in FIG. 1, the acts of the process shown in FIGS. 2A-2B can be concurrently performed in parallel by the multiple access modules 14 of the database system on different portions of the first and second relations involved in the inequality join.

To further enhance processing speed of the inequality join, a balanced binary search tree (BST) join can optionally be performed. Each of the comparisons between a second relation row and a cached first relation row adds additional cost to the inequality join. For a set of sorted rows of the first relation in the cache, a binary search is possible, with an O(log n) runtime. But for sets of rows with many duplicate keys, a number of comparisons can be eliminated by constructing the rows in a binary search tree, with the additional property that each node can represent multiple rows for each of the duplicate keys. The term "key" refers to the column or column(s) of the first or second relation that is being compared in the inequality join.

In accordance with some embodiments, by presenting the first relation segment that is in the cache as a balanced binary search tree, given n keys in the tree, the key comparison costs for duplicate keys can be eliminated from the join algorithm, which are required in the case where the balanced binary search tree technique is not used. For cases where there are no duplicate keys in the first relation, binary search of the rows sorted in cache may be faster.

Figure 3:
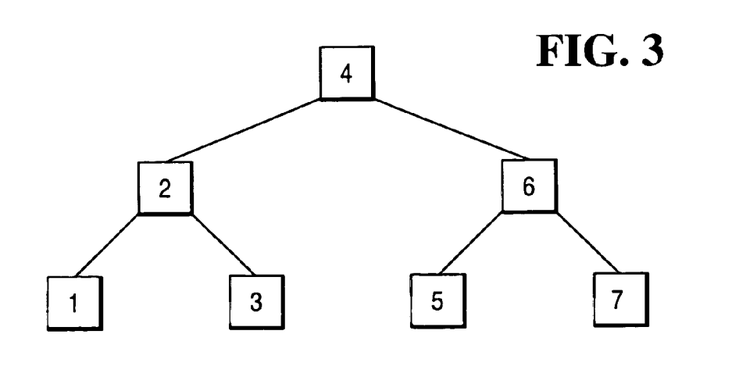
FIG. 3 illustrates a balanced binary search tree used in an inequality join, according to another embodiment.

An example binary search tree is shown in FIG. 3. The root of the tree is root node (4), with a left subtree (including nodes 2, 1, 3) and a right subtree (including nodes 6, 5, 7) depending from the root node. Each subtree has nodes from which additional lower subtrees depend. Once all matching keys for a given probe value (value of the key of a second relation row) have been found, evaluation of the inequality condition can stop, because of the following binary search tree property:

Let x be a node in a binary search tree;
if y is a node in the left subtree of x, then key[y]≦key[x];
if y is a node in the right subtree of x, then key[x]≦key[y].

According to some embodiments of the invention, the above property is modified so that no duplicate keys are allowed in the balanced binary search tree. A node is allowed to point to multiple rows, each of which contains the same key value. Disallowing duplicates provides the benefit that a smaller tree structure is needed for representing the segment of the first relation in the cache. The balanced binary search tree structure also enables the assumption that all left subtree nodes have keys less than the current node, and all right subtree nodes have keys greater than the current node, which reduces the number of comparisons in the inequality join algorithm.

In one example, assume the values of T1.C1 (column C1 in relation T1) for the segment of the first relation (T1) stored in the cache is as follows: [3, 6, 2, 7, 1, 4, 5]. In this example, column C1 constitutes the key against which comparisons are to be performed. The balanced binary search tree for this segment of relation T1 is depicted in FIG. 3. Seven nodes of the binary search tree correspond to the seven values of T1.C1. Each node in the balanced binary search tree contains pointers to the actual rows of the first relation segment in cache that contain the given key. Also, pointers to the rows that contain the minimum and maximum keys are also maintained with the binary search tree, which enables a quick decision regarding whether a search is necessary. The minimum key is referred to as T1.MINIMUM, and the maximum key is referred to as T1.MAXIMUM.

Figure 4:
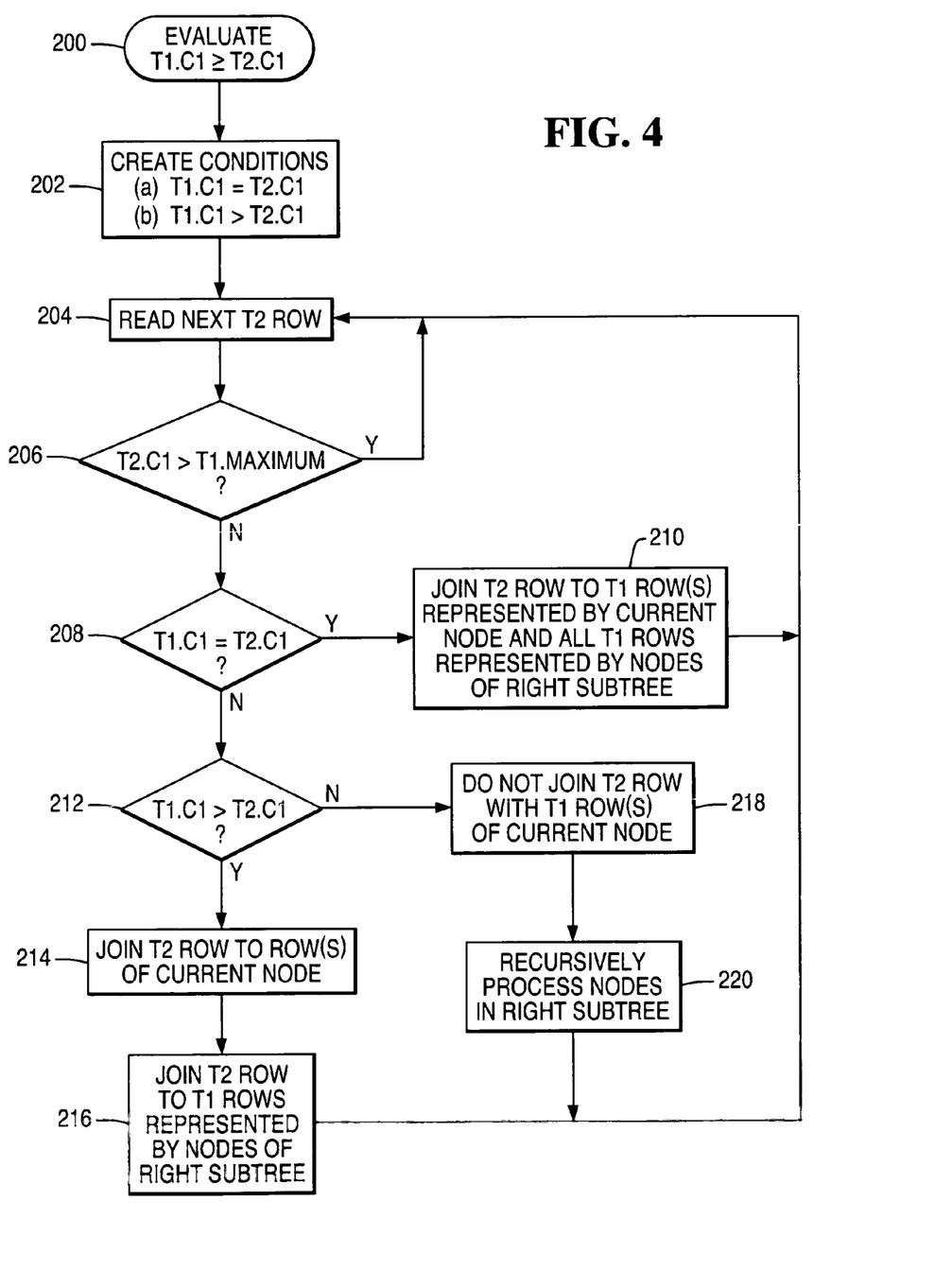
FIGS. 4 and 5 are flow diagrams of performing an inequality join using a balanced binary search tree structure.

As shown in FIG. 4, to evaluate (200) a join condition such as T1.C1≧T2.C2, the following example join procedure can be used. Because the inequality operator is a ≧operator, two conditions are specified (at 202): (a) T1.C1=T2.C2; and (b) T1.C1>T2.C1. A row of relation T2 is read (at 204) to retrieve T2.C1. The condition T2.C1>T1.MAXIMUM is evaluated (at 206) by a search function. The search function is a software module that is invoked by an access module 14 (FIG. 1) or other database software to perform comparisons during the inequality join. If true, then there is no need to perform any further comparison, as the join term cannot be satisfied. The next row from relation T2 is then read (at 204).

However, if the condition T2.C1>T1.MAXIMUM is not true, then the term T1.C1=T2.C1 is evaluated (at 208) by the search function. Note that this search function is recursively called to process conditions (a) and (b) above for nodes of the binary search tree. If the condition at 208 is true, then the T2 row is joined (at 210) to rows represented by the node corresponding to key T1.C1 currently under evaluation (also referred to as the "current node"). The T2 row is also joined with all rows represented by the right subtree nodes depending from the current node, without evaluating the join term further. All such right subtree rows have to qualify, since such right subtree rows contain a higher key value than the current node.

However, if T1.C1=T2.C1 is not true, then the condition T1.C1>T2.C1 is evaluated (at 212). If this condition is true, then the T2 row is joined (at 214) to the row that is currently represented by the current node (corresponding to T1.C1). Next, the T2 row is joined (at 216) to rows of all nodes of just the right subtree.

However, if the condition T1.C1>T2.C1 is false, then the T2 row is not joined (at 218) to the rows associated with the current node, but a recursive call is made (at 220) to the search function to compare the T2 row to nodes of the right subtree. Recursively calling the search function to compare the key of the T2 row to nodes of the right subtree involves repeating acts 208-220 for each of the nodes of the right subtree.

Note that in each of the join acts indicated by FIG. 4, if there are join terms besides the main inequality join condition, the other join terms are processed also.

To evaluate an inequality condition such as T1.C1>T2.C2, the process of FIG. 4 is performed except that the equality condition comparison at 208 and the act of 210 are not performed.

Figure 5:
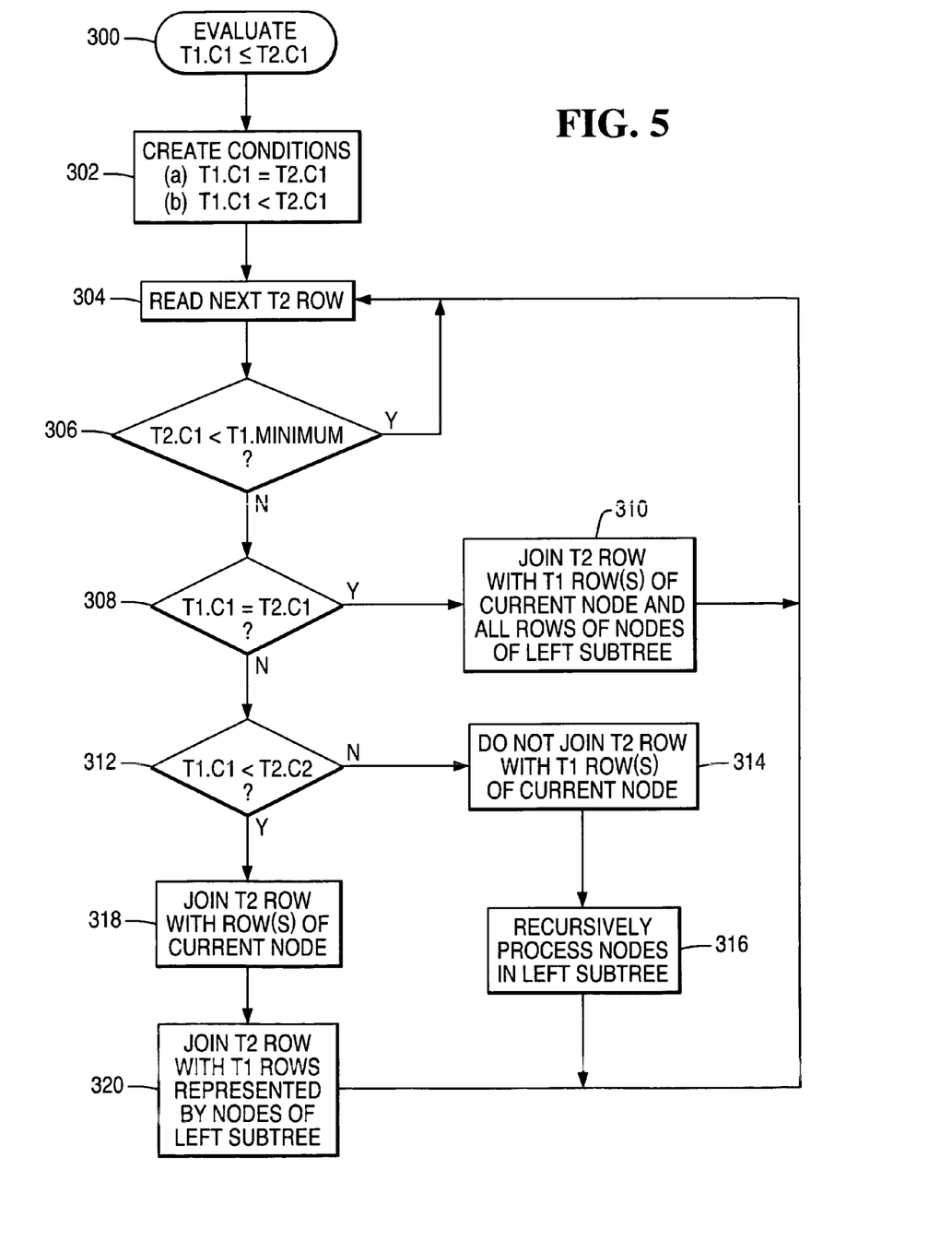

FIG. 5 illustrates the process of evaluating (300) the inequality join term T1.C1≦T2.C1. The process is similar to the process of FIG. 4, except in this case the conditions (a) T1.C1=T2.C1 and (b) T1.C1<T2.C2 are created (at 302). The next relation T2 row is read (at 304). The database system 10 then determines (at 306) if T2.C1 is less than T1.MINIMUM. If so, that means that the inequality join condition cannot be satisfied by the current T2 row. So, the next row of table T2 is read (as 304) and processed.

However, if T2.C1<T1.MINIMUM is not true, then the database system evaluates (at 308) if T1.C1=T2.C1 (condition (a) above). If true, then the relation T2 row is joined (at 310) to the T1 row(s) represented by the current node of the binary search tree. The T2 row is also joined to all rows represented by nodes of the left subtree depending from the current node. The next T2 row is then processed (at 304).

However, if T1.C1=T2.C1 evaluated at 308 is false, then the database system 10 determines (at 312) if T1.C1<T2.C2. If not, then the relation T2 row is not joined (at 314) with the rows of the current node. However, the rows of the nodes in the left subtree depending from the current node are recursively processed (at 316).

If T1.C1<T2.C2 is true, as determined at 312, then the T2 row is joined (at 318) to the rows of the current node. Then, the database system joins (at 320) the T2 row with rows corresponding to nodes in the left subtree of the balanced binary search tree.

To evaluate an inequality condition such as T1.C1<T2.C2, the process of FIG. 5 is performed except that the equality condition comparison at 308 and the act of 310 are not performed.

For a join predicate of the form (T1.C1≧T2.C1) AND P, where P represents the remaining CNF join terms, the above algorithm is updated to evaluate P in acts 204-220 (FIG. 4), but only if the initial inequality condition has evaluated to true. Thus, for example, in act 210, P would have to be evaluated for all rows in the right subtree. If P evaluates to true, then the rows of the first and second relation are joined—if P evaluates to false, then the rows are not joined.

The solution described above can also be applied to inequality terms involving expressions containing left relation and right relation columns (e.g., left expression(T1) ≧right expression(T2), where expression( ) represents any combination of deterministic functions and arithmetic expressions). For this to work, the left expression can only contain columns from one of the joined relations and constants, and the right expression can only contain columns from the other join relation and constants.

The construction of a balanced binary search tree involves first the construction of the binary search tree, and then the conversion into balanced form. A randomly built balanced search tree (that inserts keys as the keys are encountered) has an expected run time of O(n log n). However, in the worst case, the Day/Stout/Warren run time can be an $O(n^2)$ operation if the rows are already almost in sorted order. However, the Day/Stout/Warren (DSW) algorithm can convert an ordered link list (as a special structure called a vine) into a balanced binary tree in linear time, using a fixed amount of space. If an efficient sorting algorithm (e.g., heapsort) is used, which is O(n log n) when the rows fit into a sorting buffer, this sorting algorithm can be used to sort one cache of rows that fit into a join step buffer at a time. The resulting spool file includes sequences of locally sorted rows. Each sequence contains exactly the amount of rows that fit into the join cache.

Instructions of the various software routines or modules discussed herein (such as the database software, search function, and so forth) are executed on corresponding control modules. The control modules include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored on one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to a system in one of many different ways. For example, code segments including instructions stored on floppy disks, CD or DVD media, a hard disk, or transported through a network interface card, modem, or other interface device are loaded into the system and executed as corresponding software modules or layers. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the present invention has been described with respect to a limited number of embodiments, those skilled in the art, having the benefit of this disclosure, will appreciate numerous modifications and variations there from. It is intended that the appended claims cover all such modifications and variations as fall within the true spirit and scope of this present invention.

What is claimed is:

1. A method executed by at least one processor in a database system having a persistent storage and a cache, comprising:

receiving a query to perform an inequality join involving at least a join column of a first relation and a join column of a second relation;

sequentially sorting segments of the first relation in the cache;

representing each of the sorted first relation segments as a corresponding balanced binary search tree in which duplicate values of the join column of the first relation are eliminated;

receiving a first sorted segment of the first relation in the cache;

comparing the first sorted segment of the first relation in the cache with the second relation using the corresponding balanced binary search tree; and outputting a result of the query to a client station.

2. A method executed by at least one processor in a database system, the database system having a persistent storage and a cache, the method comprising receiving the query that specifies an inequality join involving at least a first relation and a second relation;

sorting a plurality of segments of the first relation in the cache;

representing each of the sorted first relation segments as a corresponding balanced binary search tree in which duplicate values of the join column of the first relation are eliminated;

after sorting all the segments of the first relation in the cache, sequentially retrieving the sorted segments of the first relation into the cache and comparing each of the retrieved sorted segments of the first relation in the cache with the second relation; and outputting results of the query to a client station.

3. The method of claim 2, wherein comparing each of the retrieved sorted segments of the first relation in the cache with the second relation comprises:

determining an inequality join condition specified for the inequality join by the query; and for a given row of the second relation, comparing the given row of the second relation with less than all rows in the sorted segment of the first relation in the cache, based on the inequality join condition and structure of the binary search tree.

4. The method of claim 2, wherein the database system comprises a parallel database system having a plurality of nodes, wherein the sorting and comparing are performed concurrently in the plurality of nodes.

5. The method of claim 2, wherein sorting the segments of the first relation in the cache is performed instead of performing an external sort of the first relation in persistent storage.

6. An article comprising at least one computer-readable storage medium containing instructions that when executed cause at least one processor in a database system to:

receive a query that specifies an inequality join involving at least a join column of a first relation and a join column of a second relation;

sort a plurality of segments of the first relation in the cache;

represent each of the sorted segments of the first relation using a balanced binary search tree in which duplicate values of the join column of the first relation are eliminated;

compare each of the sorted segments of the first relation in the cache with the second relation using the balanced binary search trees; and output a result of the query.

7. The article of claim 6, wherein the comparing is performed after sorting each of the segments of the first relation in cache and prior to sorting a subsequent one of the segments of the first relation.

8. The article of claim 6, wherein comparing a particular one of the sorted segments of the first relation in the cache with the second relation comprises comparing the particular sorted segment of the first relation in the cache with each row of the second relation.

9. The article of claim 8, wherein comparing the particular sorted segment of the first relation in the cache with the second relation comprises:

determining an inequality join condition specified for the inequality join by the query; and for a given row of the second relation, comparing the given row of the second relation with less than all rows in the particular segment of the first relation in the cache, based on the inequality join condition and structure of the corresponding balanced binary search tree.

10. The article of claim 6, wherein sorting the segments of the first relation in the cache is performed instead of performing an external sort of the first relation in persistent storage.

11. The article of claim 6, wherein the comparing is performed after all of the segments of the first relation have been sorted.

12. A database system, comprising:

a persistent storage to store at least a first relation and a second relation;

a cache;

a controller comprising at least one processor to:

receive a query that specifies an inequality join involving at least a join column of the first relation and a join column of the second relation;

sort a plurality of segments of the first relation in the cache rather than perform an external sort of the first relation in the persistent storage;

represent each of the sorted segments of the first relation using a balanced binary search tree in which duplicate values of the join column of the first relation are eliminated;

compare each sorted segment of the first relation in the cache with the second relation using a corresponding search tree; and output a result of the query.

13. The database system of claim 12, wherein the controller is adapted to perform the comparing after sorting all of the segments of the first relation in the cache.

* * * * *